(12) United States Patent  (10) Patent No.: US 8,281,653 B2
Schrotter  (45) Date of Patent: Oct. 9, 2012

(54) TEST STAND FOR AN INTERNAL COMBUSTION ENGINE

(75) Inventor: Wolfgang Schrotter, Graz (AT)

(73) Assignee: AVL List GmbH, Graz (AT)

( * ) Notice: Subject to any disclaimer, the term of this patent is extended or adjusted under 35 U.S.C. 154(b) by 278 days.

(21) Appl. No.: 12/805,178

(22) Filed: Jul. 15, 2010

(65) Prior Publication Data

US 2011/0011169 A1    Jan. 20, 2011

(30) Foreign Application Priority Data

Jul. 20, 2009  (AT) ............................... GM 450/2009

(51) Int. Cl.
  *G01M 15/00*  (2006.01)
  *G01M 17/00*  (2006.01)
(52) U.S. Cl. ................................. 73/116.02; 73/116.01
(58) Field of Classification Search ............... 73/116.02, 73/116.01
  See application file for complete search history.

(56) References Cited

U.S. PATENT DOCUMENTS

2010/0005875 A1* 1/2010 Pickl et al. ................. 73/116.02

FOREIGN PATENT DOCUMENTS

DE    10259528    8/2004

OTHER PUBLICATIONS

English Abstract of DE10259528, Aug. 26, 2004.

* cited by examiner

*Primary Examiner* — Lisa Caputo
*Assistant Examiner* — Jamel Williams
(74) *Attorney, Agent, or Firm* — Dykema Gossett PLLC

(57) ABSTRACT

A test stand for an internal combustion engine is provided with a drive (2) and/or load system (3), a force transmission device (4) for connecting the internal combustion engine with the drive and/or load system (3), and a sensor and evaluation system for automatically collecting and evaluating measurement variables, wherein the force transmission device (4) comprises a system for detecting torque and rotation angle (6), which system is coupled to the internal combustion engine in a torsionally stiff manner, to achieve a coupling between the test object and the system for detecting torque and rotation angle, which coupling is improved for exact measurements, the force transmission device has at least one vibration damper (7) which is arranged on that side of the system for detecting torque and rotation angle (6) which is opposite to the internal combustion engine.

3 Claims, 1 Drawing Sheet

TEST STAND FOR AN INTERNAL COMBUSTION ENGINE

Figure 1:
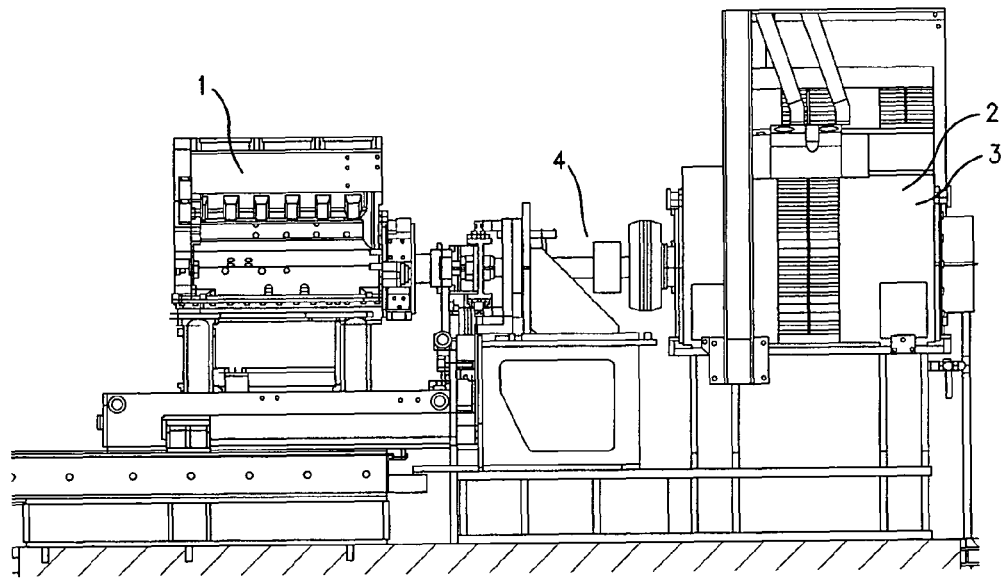

The invention relates to a test stand for an internal combustion engine, comprising a drive and/or load system, a force transmission device for connecting the internal combustion engine with the drive and/or load system, and a sensor and evaluation system for automatically collecting and evaluating measurement variables, wherein the force transmission device comprises a system for detecting torque and rotation angle, which system is coupled to the internal combustion engine in a torsionally stiff manner.

For quality assurance of internal combustion engines in series production, a functional test (cold test) and a performance test (hot test) are often required in the production environment. On the test stand according to the invention, important functional tests and a complete performance test can be carried out on the completely assembled internal combustion engine.

In DE 102 59 528 B3, a test stand with a detachable coupling of a load unit for a hot test and a drive unit for a cold test of an internal combustion engine is disclosed. For this, an electrical multi-function aggregate can also be used.

It is typical for performance test stands, and also described in the mentioned DE 102 59 528 B3, that for torque measurement, viewed from the internal combustion engine, a torque measuring flange is arranged downstream of a vibration damper and thus in a torsionally soft manner. However, this makes it physically impossible to exactly measure the torque which occurs at the connection point to the internal combustion engine and which changes depending on the crankshaft angle.

Rotation angle measurements are quite common in the context of functional tests. In theory, the rotation angle or crank angle can be derived from the torque curve of an ideal engine, which does not apply for real engines, however, so that here for torque measurement and rotation angle measurement, different sensors are used.

Thus, the object of the present invention was a test stand with a coupling between the test object and the system for detecting torque and rotation angle, which coupling is improved for exact measurements.

To solve this object, the test stand is characterized according to the invention in that the force transmission device has at least one vibration damper which is arranged on that side of the system for detecting torque and rotation angle which is opposite to the internal combustion engine. For this purpose, the sensor system, which comprises for example a torque measuring flange, is mounted in a torsionally stiff manner between the internal combustion engine and the vibration damper. By means of these measures of the special arrangement of the sensor system in the force transmitting device, including the torsionally stiff coupled torque and rotation angle measurement, and within an automated test of components of an internal combustion engine and their proper assembly on the test stand, the exact and conclusive collection and evaluation of relevant measurement variables, in particular breakaway and drag torques, vibration and/or noise of at least one internal combustion engine component, and the pressure curve of a potentially existing injection system is now possible.

According to an advantageous embodiment of the invention it is provided that the force transmission device has at least one multi-disk clutch which is arranged on that side of the system for detecting torque and rotation angle which is facing the internal combustion engine.

Preferably, the force transmission device has at least one torsion rod on that side of the system for detecting torque and rotation angle which is facing the internal combustion engine.

In the following description, the invention is to be illustrated in more detail by means of a preferred exemplary embodiment and with reference to the attached drawings.

Figure 2:
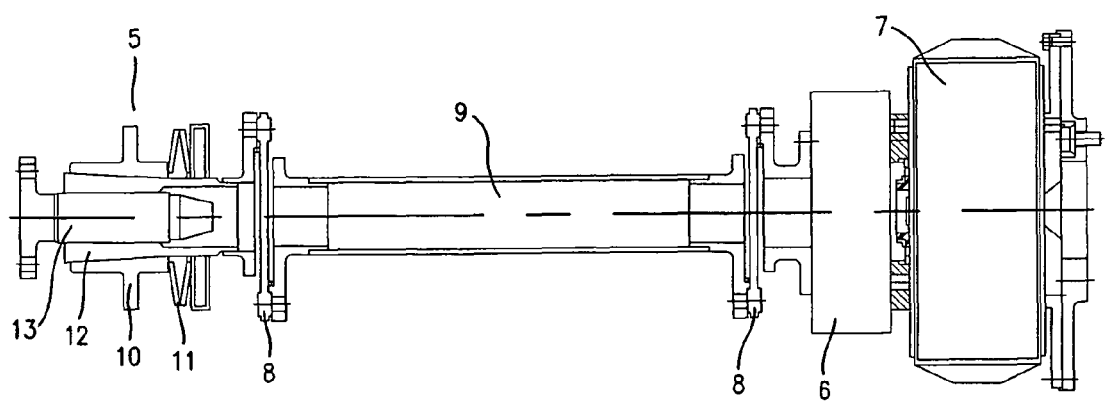

FIG. 1 shows an engine test stand in an overview and FIG. 2 shows a force transmission device according to the invention of said test stand in a larger scale.

An internal combustion engine 1 is connected to a drive 2 and/or load system 3. The internal combustion engine can be a gasoline engine or a diesel engine. Here, for driving, in case of a cold test, and for inducing a load, in case of a hot test, separate electric machines can be used; however, a multi-function machine can also be used. The internal combustion engine 1 is coupled with the drive and/or load system 2, 3 via a force transmitting device 4, wherein said force transmitting device 4 is illustrated in detail in FIG. 2.

Besides the system 5 for a non-destructive and play-free coupling of the internal combustion engine 1 to the force transmission device 4, it also includes a sensor system 6 which is coupled to the internal combustion engine 1 in a torsionally stiff manner for collecting different measurement variables. Said sensor system 6 which comprises at least one torque measuring flange and one rotation angle sensor is arranged between that side of a vibration damper 7 which is facing the internal combustion engine 1 and the system 5 for coupling to the internal combustion engine 1. Potentially provided multi-disk clutches 8 and/or a torsion rod 9 are preferably provided between the sensor system 6 and the system 5 for coupling to the internal combustion engine 1. Preferably, at each of the ends of the torsion rod 9, one multi-disk clutch 8 is provided, wherein one multi-clutch disk 8 connects the torsion rod 9 with the system 5, and the second multi-disk clutch 8 connects the torsion rod with the sensor system 6.

In the exemplary embodiment of the invention illustrated in FIG. 2, the system 5 comprises a clamping collet 10 which is conically formed on the inside and which can be pushed by means of the spring force of a disk spring 11 over an internally toothed and longitudinally slotted clamping sleeve 12 which is conically formed on the outside. Thereby, a power takeoff shaft 13 of the internal combustion engine 1, which shaft is inserted in the clamping sleeve 12, can be enclosed in a form and force fitting manner without user intervention.

By means of said play-free coupling, an improved signal quality of the received measurement variables can be ensured so that the signals can be processed in an easier and better manner into more conclusive measurement values.

The invention claimed is:

1. A test stand for an internal combustion engine (1) comprising a drive (2) and/or load system (3), a force transmission device (4) for connecting the internal combustion engine with the drive and/or load system (3), and a sensor and evaluation system for automatically collecting and evaluating measurement variables, wherein the force transmission device (4) comprises a system for detecting torque and rotation angle (6), which system is coupled to the internal combustion engine in a torsionally stiff manner, wherein the force transmission device has at least one vibration damper (7) which is arranged on that side of the system for detecting torque and rotation angle (6) which is opposite to the internal combustion engine.

2. The test stand according to claim 1, wherein the force transmission device has at least one multi-disk clutch (8)

which is arranged on that side of the system for detecting torque and rotation angle (6) which is facing the internal combustion engine.

3. The test stand according to claim 1, wherein the force transmission device has at least one torsion rod (9) on that side of the system for detecting torque and rotation angle (6) which is facing the internal combustion engine.

* * * * *